(12) United States Patent
Diederichs

(10) Patent No.: US 7,913,247 B2
(45) Date of Patent: Mar. 22, 2011

(54) SOFTWARE UPDATES BASED ON RSS FEEDS

(75) Inventor: Stefan Diederichs, Renningen (DE)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 11/674,229

(22) Filed: Feb. 13, 2007

(65) Prior Publication Data

US 2008/0196022 A1 Aug. 14, 2008

(51) Int. Cl.
*G06F 9/44* (2006.01)
*G06F 9/445* (2006.01)
*G06F 15/177* (2006.01)

(52) U.S. Cl. ........ 717/173; 717/169; 717/175; 717/178; 709/220

(58) Field of Classification Search .......... 717/168–178; 709/220–223
See application file for complete search history.

(56) References Cited

U.S. PATENT DOCUMENTS

| | | | |
|---|---|---|---|
| 2006/0129422 A1 | 6/2006 | Kim et al. | |
| 2006/0155698 A1 | 7/2006 | Vayssiere et al. | |
| 2006/0173985 A1* | 8/2006 | Moore | 709/223 |
| 2006/0230021 A1 | 10/2006 | Diab et al. | |
| 2006/0230061 A1 | 10/2006 | Sample et al. | |
| 2006/0242663 A1 | 10/2006 | Gogerty et al. | |
| 2006/0259492 A1 | 11/2006 | Jun et al. | |
| 2006/0277291 A1 | 12/2006 | Misbach | |
| 2007/0022174 A1* | 1/2007 | Issa | 709/217 |
| 2007/0094363 A1* | 4/2007 | Yruski et al. | 709/220 |
| 2007/0094365 A1* | 4/2007 | Nussey et al. | 709/223 |
| 2007/0220505 A1* | 9/2007 | Bukovec et al. | 717/168 |
| 2008/0189702 A1* | 8/2008 | Morgan et al. | 718/100 |
| 2008/0196020 A1* | 8/2008 | Clinton et al. | 717/172 |
| 2008/0196021 A1* | 8/2008 | Clinton et al. | 717/172 |

FOREIGN PATENT DOCUMENTS

JP 2006285705 A * 10/2006

OTHER PUBLICATIONS

Jansen, Slinger; "Alleviating the Release and Redeployment Effort of Product Software by Explicitly Managing Component Knowledge"; Citeseer, 2006, 10pg.*
Yuki et al., "An Efficient Approach for Providing Update Information Among Networked Appliances"; IEEE, 2005, 5pg.*

(Continued)

*Primary Examiner* — Wei Y Zhen
*Assistant Examiner* — Ryan D Coyer
(74) *Attorney, Agent, or Firm* — Yee & Associates, P.C.; Matthew W. Baca

(57) ABSTRACT

The present invention relates to providing updates of software products via a network, for example the Internet. In order to provide a simple software updates download method which can be run automatically without major manual interference, once some initial work has been done, a Download server side performs the steps of: a) generating a RSS file including information for defining name and location of a file comprising said software update, b) offering the RSS file on a download server, c) evaluating incoming download requests if the request comprises a notation of the RSS file, and d) if the request comprises a notation of the RSS file, sending said file to the requesting user. At the update requesting side a RSS reader program for managing a subscription list is used, wherein each member of the subscription list comprises the definition of a download source file.

20 Claims, 3 Drawing Sheets

Figure 1:
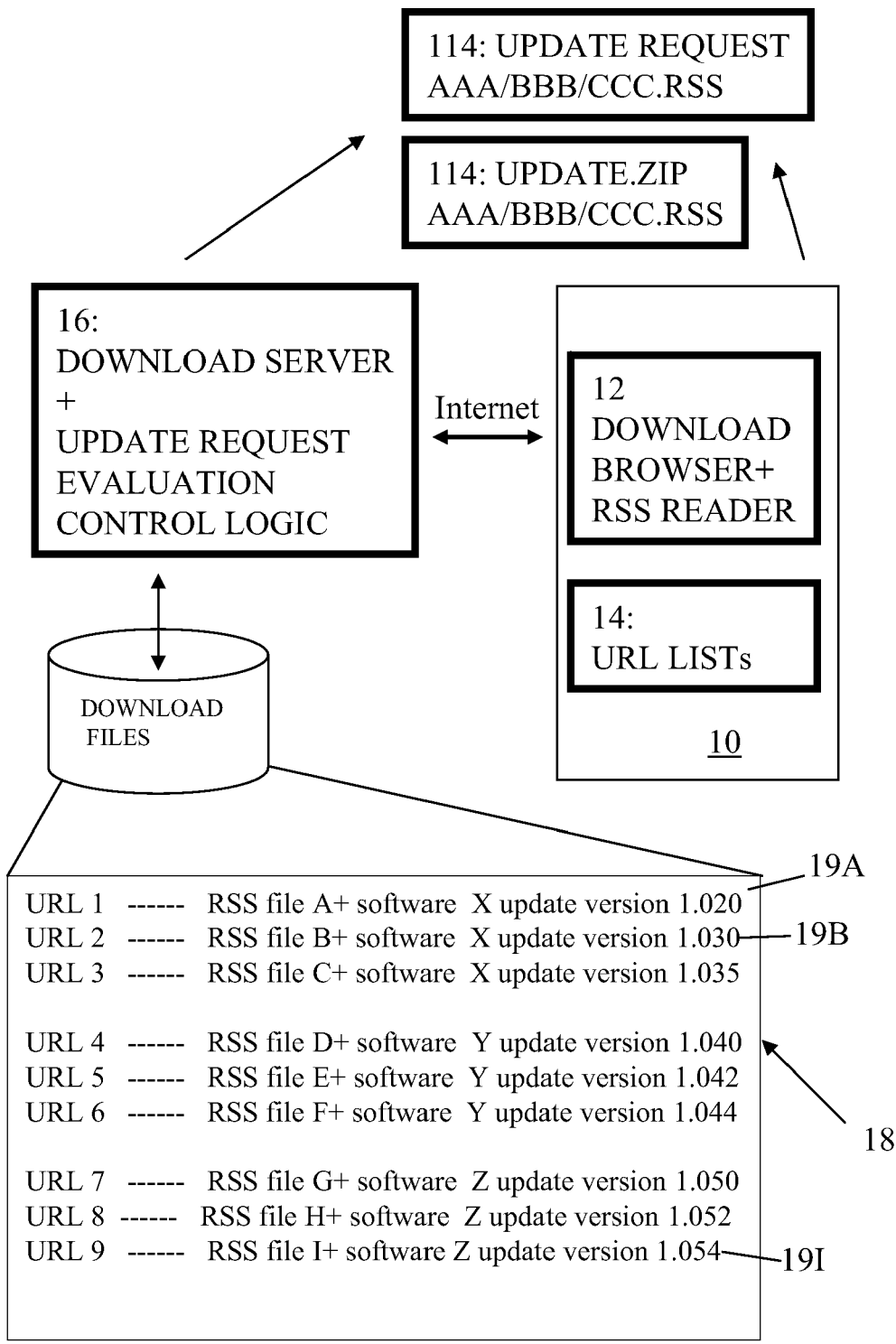

OTHER PUBLICATIONS http://en.wikipedia.org/wiki/RSS_(file_format) Feb. 1, 2007.
http://www.podnova.com/index_about_podnova.srf Feb. 1, 2007.
http://apple.com/itunes Feb. 8, 2007.
http://juicereceiver.sourceforge.net Feb. 1, 2007.

* cited by examiner

SOFTWARE UPDATES BASED ON RSS FEEDS

1. BACKGROUND OF THE INVENTION

1.1. Field of the Invention

The present invention relates to the field of electronic network computing and in particular to a method and respective system for providing updates of software products via the network, for example the Internet.

1.2. Description and Disadvantages of Prior Art

Many software vendors offer a website accessible via the Internet, on which different software updates or respective different products are offered to be downloaded by an interested user. In regard of the software vendors interests a download procedure expected to be performed by the interested user may be assumed to follow a consistent, logic. As this logic is the same for each of the offered products, or at least similar, the way to offer the software updates of the software products may be regarded as consistent. In view of a single user having installed only one product or several products of the same vendor this may be considered also as consistent and tolerable.

The software product administration of a larger enterprise, however, which manages the software updates of quite a lot of user applications is, however, quite complicated to do because until now different software vendors apply different procedures to offer their updates. One vendor for example defines a single download area for a single product, where the download files are presented in any reasonable order and arrangement, the other software vendor offers different web pages for different products, where the user is expected to go, and again another software vendor, see for example Adobe®, and the Adobe Reader®, portable document file viewer application, makes the application to look automatically at the vendor's website in order to check if a new software update is present, or not. Another software vendor may be assumed to ship any software update by post mail whereas a further vendor, e.g. Microsoft® establishes a dedicated download manager (Windows® update) which systematically checks the single components resident on a user's computer and provides respective software updates for each component basically transparent to the user.

In this case the user must trust that his system is still running after installation of the update, as this will be done automatically.

So, if an enterprise's software administration stuff must provide updates for tens or may be hundreds of different software applications, this is a quite complicated task which disadvantageously includes much manual work together with some experiences and extended IT-knowledge.

1.3. Objectives of the Invention

The objective of the present invention is to provide a more simple software updates download method which can additionally be run automatically without major manual interference, once some initial work has been done.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

The present invention is distributed in at least two locations, namely the download server hosting the download files and providing the software updates, and a user application interface at the downloading side, for example an enterprise's software administration staff member. At both locations individual parts of the inventional method are operated in a cooperative way. Both parts contribute to the general idea of the present invention to use a prior art "RSS feed mechanism" for monitoring the general availability of a software update of a given software product on a networked download server, including the download procedure itself.

"RSS" is an abbreviation for RDF Site Summary or Rich Site Summary, an XML format for syndicating Web content. A Web site that is intended to allow other sites to publish some of its content creates an RSS document and registers the document with an RSS publisher. A user who can read RSS-distributed content with a RSS Reader program can use the content on a different site. As content is fed repeatedly to the user, this mechanism is understood as "RSS feed" mechanism. Syndicated content, i.e., mostly licensed content shared between different Websites, includes in prior art data such as news feeds, events listings, news stories, headlines, project updates, excerpts from discussion forums, etc. In the present invention the content is software updates, and the software vendor preferably takes the role of the content creator and the content publisher concurrently.

The download target system may be preferably an intermediate computer system which is used for test purposes before a software update is distributed after a successful test to any number of users. Alternatively, the target system can also be the end user's own system. The network used for downloading is preferably the Internet.

On an enterprise level, where an intermediate system is used, some RSS-reader program is installed which may process RSS feeds. Basically, such RSS feed reader exists already. The novelty of the present invention is based on the fact that such tool which is commonly used until now exclusively for providing news or consumer files, like MP3 files, MP4 files, etc. is used now for the download management of software update files, for example ZIP files which include any given plurality of software update components.

At the web server the software vendor offering any given software update generates a "RSS" file, which includes at least the name or a link to an update file. This RSS file is offered in the download area under any specific URL to be selected by the software vendor. Concurrently, preferably the same file system and the same path of the RSS file of the actual software update files which are mentioned in the RSS file are stored.

The downloading user is provided with the above-mentioned prior art RSS reader tool and adds a number of feeds, at least one, in its subscription list, wherein the feed contains the before-mentioned URL, preferably ending with the name of the RSS file. Then, for downloading the software update the downloading user needs simply to follow the way he is already accustomed to, when he uses the same reader program using for subscriptions for consumer files, like MP3, MP4, etc. This is basically done by a user activating the "refresh-button" of its reader program. This user action triggers a message to be sent to the download server, to the pre-specified URL in order to again trigger the download process from the download server to the requesting user. Thus, the desired software update is downloaded to the requesting intermediate system.

Version management can be implemented in different ways; a preferred way is to include the current version number of the requesting system into its download request. Then a respective evaluation control logic located at the download server selects the appropriate software update package. The packages, of course must be prepared at the vendor side as this is required also in prior art.

3. BRIEF DESCRIPTION OF THE DRAWINGS

Figure 2:
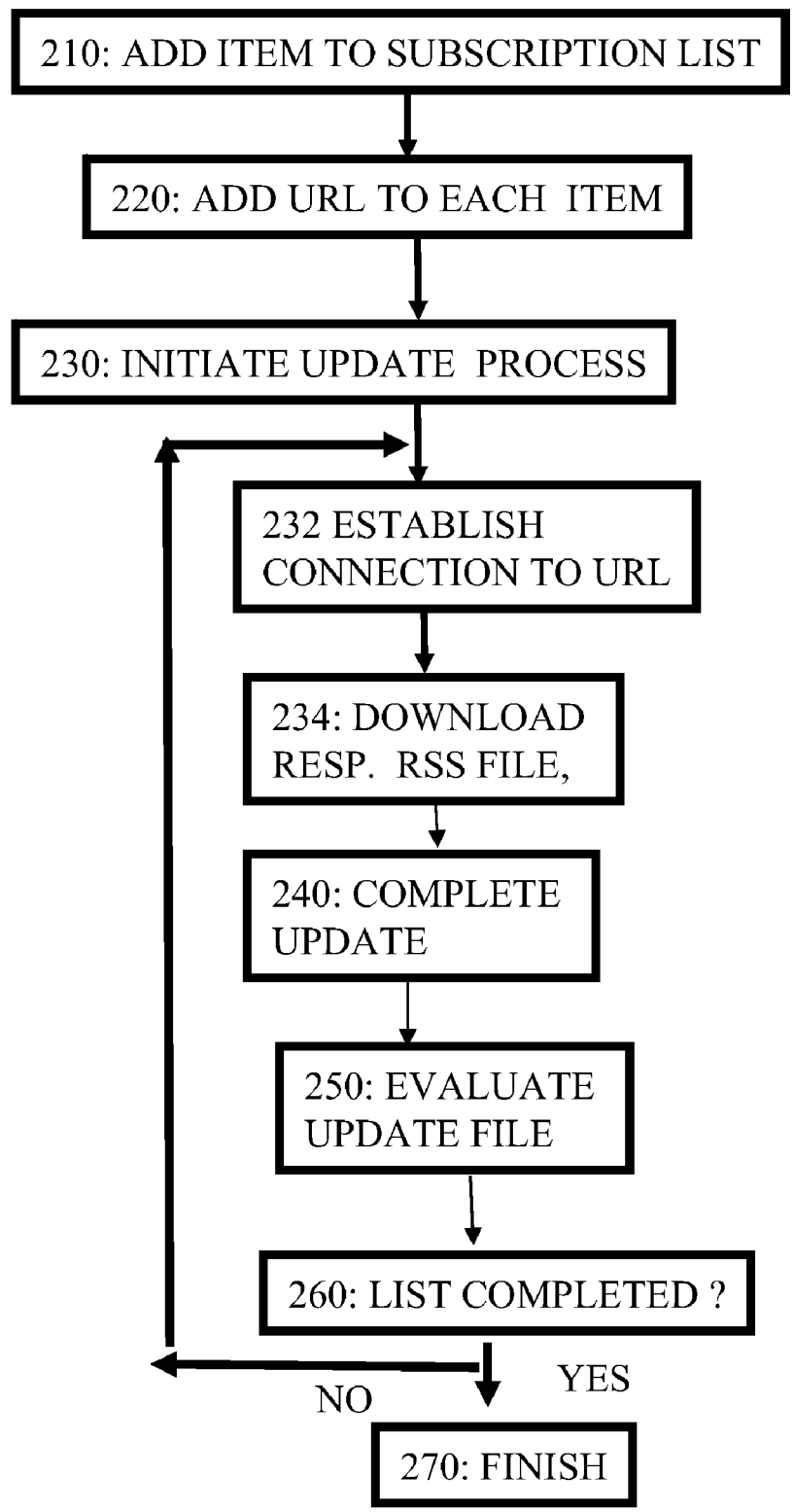
Figure 3:
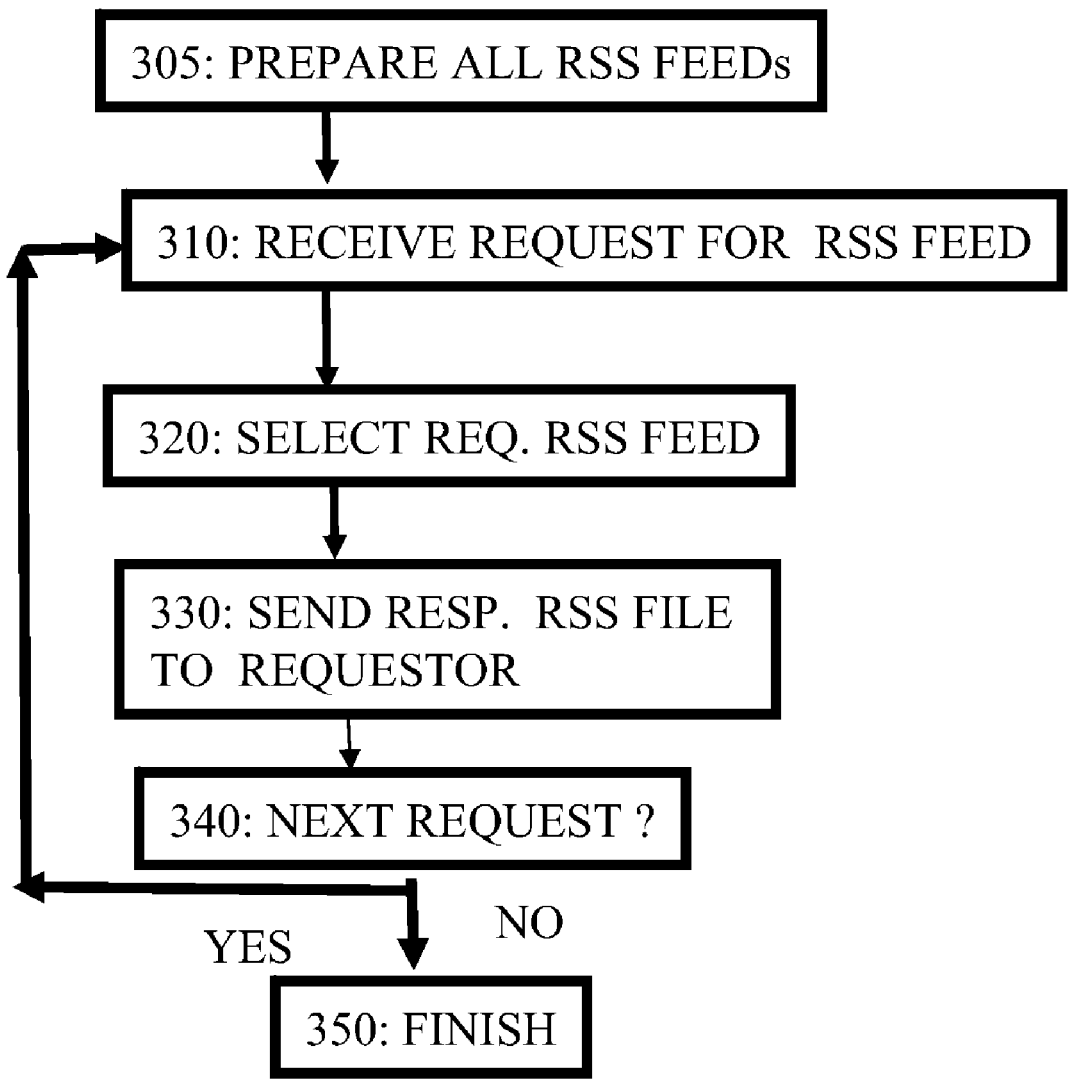

The present invention is illustrated by way of example and is not limited by the shape of the figures of the drawings in which:

FIG. 1 illustrates the most basic structural components used during the inventional method, both at the download server side and at the downloading side, FIG. 2 illustrates the most important steps of a preferred embodiment of the inventional method performed at the downloading user side, and FIG. 3 illustrates the respective steps to be performed at the download server side.

4. DETAILED DESCRIPTION OF THE PREFERRED EMBODIMENT

With general reference to the figures and with special reference now to FIG. 1 a software administration staff member of an enterprise is assumed to use the man machine-interface of a user Personal Computer (PC) 10 connected to the Internet. The user PC 10 is connected to the Intranet of the enterprise and hosts a prior art podcast reader application 12 which is commercially available in prior art. Examples of commercially available podcast reader applications include: Podnova® podcast reader application, I-Tunes® podcast reader application, Juice Receiver® podcast reader application. One or more of these podcast reader applications may be available to be downloaded via the Internet.

Managed by this RSS reader application 12 some subscription lists 14 of URLs are stored, as this is expected by the RSS reader. Those URLs specify the download source mentioned later.

Somewhere also connected to the Internet the download source computer 16 is located and provided with for example a HTTP server functionality. This download server 16 stores any required plurality of pairs of RSS files to be described later below, and respective software update packages. This list of pairs is denoted by reference sign 18. This list 18 is thus a list of RSS feeds 19A ... 19I.

With reference to FIG. 2 the configuration of the RSS reader program for being used to download software updates and the operation thereof will be described next below:

In a first step 210 the user at user PC 10 opens its subscription list window and adds a new item to its subscription list. Each new item he adds represents a software product, for which a respective URL exists which is supported by the software vendor, and at which a respective software update package is provided for download.

In case that a number of 120 software products must be managed by the software administration user of the above-mentioned enterprise this lists holds at least one entry for each product. This principle can be, of course also varied, by making some distinction, for example by adding an item for an individual program component which is to be provided for being updated. As an example a word processor component, a spread sheet application and a desktop publishing component in a prior art office program application suit can be mentioned.

In step 220 a respective URL is added to each item of the subscriber list. This URL defines the location of the download source of the respective software product. In terms of RSS prior art technology, this URL specifies an "RSS feed". Then, the user side is configured to be operated. Assume, the URLs are also operable at the download server side and the before-mentioned list 18 is complete and stored under respective different URLs at the server side, the reader may be operated.

Thus, in order to check for new updates, in a step 230 the administration user 10 may initiate an update mechanism manually by pushing an update button provided on the RSS reader user interface. Or, depending on the actual implementation of the inventional method he may trigger an automated update mechanism just by specifying the time when an automated update should be performed.

Details of the update are as follows: during this update procedure, for each entry in the subscription list 18 the required connection to the pre-specified URL is established, and the respective specific RSS file is downloaded from the HTTP server 16. This, is preferably implemented such that a download is only done when the actual version number specifies that an update is available.

If the user system 10 is already provided with the highest version number update, preferably no download will be performed. In this respect the skilled reader will appreciate from the sample RSS files which are given below in an exemplary form programmed in XML, that version management can easily be done by evaluating the version information given in their enclosure URL line and in the file name itself provided therein. This file name includes the version number of the software update.

Next, a sample RSS file is shown for improved clarity, containing two updates for an UNIX® computer operating system, derivate AIX® Operating system:

```
<?xml version="1.0"?>
<rss version="2.0">
<channel>
<title>AIX Updates</title>
<link>http://www-
03.ibm.com/servers/eserver/support/unixservers/aixfixes.html</link>
<description>Technology Level 5300-04</description>
<language>en-us</language>
<copyright>2006</copyright>
<lastBuildDate>2/14/2006</lastBuildDate>
<webMaster>service@ibm.com</webMaster>
<ttl>1</ttl>
<item>
<title>bos.64bit</title>
<enclosure
url="http://www.ibm.com/rss/aix/bos.64bit.5.3.0.40.bff"
length="150528">
</item>
<item>
<title>bos.acct</title>
<enclosure
url="http://www.ibm.com/rss/aix/bos.acct.5.3.0.40.bff"
length="884736">
</item>
</channel>
</rss>
```

Note that the file name in the URL line comprises the version number.

So, in step 240 any available software update is retrieved for a specific entry of the subscriber list of the user 10. This information, which software updates are available is sent back to the user 10 who may then actually select an item or not, step 250. Then in step 260 a new item may be defined for being downloaded. In the YES-case of step 260 the next entry of the subscription list is processed in the same way as described before. So, for each entry of the subscription list an individual connection to the specified URL is established, remark that this may be a large number of URLs which may be all different to each other.

After the last item of the subscription list has been processed, the procedure has been completed, step 270. It should be noted that it is preferred to show the user within the reader, if or if not, a new software update is present at the software vendor's website before prompting him for download. This might be easily implemented by a simple comparison of version numbers, that one resident already on the user side and that one of the update package.

With reference to FIG. 3, at the download server side the following control flow of the inventional embodiment will be preferably used as follows:

In a preparative step 305 for each software product offered for an inventional update, an RSS file is generated and deployed at a given storage resource, readily applicable for download purposes. A http server, for example, is implemented to evaluate incoming update requests.

Once a request is received, see step 310 and steps 232, 234 in FIG. 2, the payload of the request is evaluated and scanned for RSS file identification information, see FIG. 1, the list 18 for reference. In particular, and preferably the URL of the incoming request is evaluated and checked if it mentions or contains a link for a RSS feed implemented at the server side.

As the information, which update for which product will be published at the Portal of the software vendor offering this inventional update procedure, the incoming request will contain the proper information necessary for determining which RSS file is the correct one and holding the correct update package for the requesting user.

Of course, the request may already contain additional information telling the vendor further details on the hardware and operating system resident at the update requesting side. Thus, the correct RSS file will be selected in a step 320, and will be sent to the requesting user in step 330.

Then after the RSS file precisely determined, it is sent to the requesting user.

A skilled user will appreciate that this procedure is repeated via step 340 and again 310, . . . , until no more requests come in. Thus, the loop of FIG. 3 is quit and the control has been finished.

As the loop of FIG. 2 is meant to comprise update of several vendors, one may exemplarily assume that when the loop having a total iteration number of 100, for example iteration 1 to 20 bear requests to vendor A, iterations 21 to 71 are directed to vendor B, and the rest is for vendor C, for example.

At the download server side the implementation of RSS feeds for software updates according to the inventional method is done by an XML file provided for each RSS feed.

The preferred implementation of such RSS feed is a file that contains a list of files which are available as software updates. There can be one or more software updates in a single RSS feed.

Multiple variations of the described embodiment are feasible. For example, a combination with the method of subscribing to updates to achieve a pushing mechanism by the software provider.

It should be noted that the inventional method is pulled by the software user instead of being pushed by the software provider as it is done in prior art in the widely used method of subscribing to and receiving newsletters via e-mail.

If there is information about available software updates for a specific subscribed software feed already available, this information is updated with the newly downloaded RSS file information.

The result of the comparison is shown to the user.

To enable the reader the download software updates, there are no changes in the reader necessary.

Advantageously, there are no interfaces to other components e.g. browsers.

The further transfer of the software update packages to the actual target system or target systems of the enterprise may then be performed when eventually, a test of the new update has been successfully completed. The actual transfer follows prior art procedures and may use any suited protocol, like FTP, SCP or NFS, etc.

The present invention can be realized in hardware, software, or a combination of hardware and software. An automatic update tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

The invention claimed is:

1. A method for managing software updates of a software product, the method comprising:

receiving a list of a plurality of software products from a user, wherein the plurality of software products are supported by a plurality of vendors;

determining a uniform resource locator (URL) of a download source for software update packages for each of the plurality of software products in the list, wherein the URL specifies a feed, wherein the feed is one of a resource description framework site summary feed and a rich site summary feed;

storing the list of the plurality of software products in association with the URL for each of the plurality of software products in the list on a download server;

responsive to receiving an update request, accessing, at the download server via the URL, a file of the feed specified in the URL, wherein the file of the feed is one of a resource description framework site summary file and a rich site summary file;

determining whether a version number in the file indicates that an update for a software product in the list is available; and responsive to determining that the file specifies that an update for the software product in the list is available, downloading the file to the download server, wherein the download of the file is performed without any of the plurality of vendors sending the feed to the download server or the user.

2. The method of claim 1 further comprising:

maintaining a listing of a number of files downloaded to the download server in association with the list of the plurality of software products at the download server, wherein the number of files are one of resource description framework site summary files and rich site summary files, wherein the number of files include a version number for a software product in the list of the plurality of software products.

3. The method of claim 2, wherein the file of the feed specified in the URL is a new file and wherein determining whether a version number in the new file indicates that an update for a software product in the list is available further comprises:
comparing a version number in a maintained file in the listing of the number of files maintained at the download server with the version number in the new file that has been accessed to determine whether the new file indicates that the update for the software product is available.

4. The method of claim 1, wherein the update request is a manual request received from the user.

5. The method of claim 1, wherein the update request is automatically triggered after a predetermined amount of time.

6. The method of claim 1, wherein the file is based on an extensible markup language (XML) format.

7. The method of claim 1, wherein for each software product supported by the plurality of vendors, a separate file is offered on the download server.

8. A computer program product for managing software updates of a software product, the computer program product comprising:
a computer readable storage medium having computer readable program code embodied therewith, the computer readable program code comprising:
computer readable program code configured to receive a list of a plurality of software products from a user, wherein the plurality of software products are supported by a plurality of vendors;
computer readable program code configured to determine a uniform resource locator (URL) of a download source for software update packages for each of the plurality of software products in the list, wherein the URL specifies a feed, wherein the feed is one of a resource description framework site summary feed and a rich site summary feed;
computer readable program code configured to store the list of the plurality of software products in association with the URL for each of the plurality of software products in the list on a download server;
computer readable program code configured to access, responsive to receiving an update request, at the download server via the URL, a file of the feed specified in the URL, wherein the file of the feed is one of a resource description framework site summary file and a rich site summary file;
computer readable program code configured to determine whether a version number in the file indicates that an update for a software product in the list is available; and
computer readable program code configured to download, responsive to determining that the file specifies that an update for the software product in the list is available, the file to the download server, wherein the download of the file is performed without any of the plurality of vendors sending the feed to the download server or the user.

9. The computer program product of claim 8, wherein the computer readable program code further comprises:
computer readable program code configured to maintain a listing of a number of files downloaded to the download server in association with the list of the plurality of software products at the download server, wherein the number of files are one of resource description framework site summary files and rich site summary files, wherein the number of files include a version number for a software product in the list of the plurality of software products.

10. The computer program product of claim 9, wherein the file of the feed specified in the URL is a new file and wherein the computer readable program code configured to determine whether a version number in the new file indicates that an update for a software product in the list is available further comprises:
computer readable program code configured to compare a version number in a maintained file in the listing of the number of files maintained at the download server with the version number in the new file that has been accessed to determine whether the new file indicates that the update for the software product is available.

11. The computer program product of claim 8, wherein the update request is a manual request received from the user.

12. The computer program product of claim 8, wherein the update request is automatically triggered after a predetermined amount of time.

13. The computer program product of claim 8, wherein the file is based on an extensible markup language (XML) format.

14. The computer program product of claim 8, wherein for each software product supported by the plurality of vendors, a separate file is offered on the download server.

15. A data processing system for managing software updates of a software product, the data processing system comprising:
a storage device storing computer readable program code;
a processing unit operably connected to the storage device via a memory and a bus, wherein the processing unit is configured to execute the computer readable program code to:
receive a list of a plurality of software products from a user, wherein the plurality of software products are supported by a plurality of vendors;
determine a uniform resource locator (URL) of a download source for software update packages for each of the plurality of software products in the list, wherein the URL specifies a feed, wherein the feed is one of a resource description framework site summary feed and a rich site summary feed;
store the list of the plurality of software products in association with the URL for each of the plurality of software products in the list on a download server;
access, responsive to receiving an update request, at the download server via the URL, a file of the feed specified in the URL, wherein the file of the feed is one of a resource description framework site summary file and a rich site summary file;
determine whether a version number in the file indicates that an update for a software product in the list is available; and
download, responsive to determining that the file specifies that an update for the software product in the list is available, the file to the download server, wherein the download of the file is performed without any of the plurality of vendors sending the feed to the download server or the user.

16. The computer program product of claim 8, wherein the processing unit is further configured to execute the computer readable program code to:
maintain a listing of a number of files downloaded to the download server in association with the list of the plurality of software products at the download server, wherein the number of files are one of resource description framework site summary files and rich site summary files, wherein the number of files include a version number for a software product in the list of the plurality of software products.

17. The computer program product of claim 9, wherein the file of the feed specified in the URL is a new file and wherein in executing the computer readable program code to determine whether a version number in the new file indicates that an update for a software product in the list is available the processing unit is further configured to execute the computer readable program code to:

compare a version number in a maintained file in the listing of the number of files maintained at the download server with the version number in the new file that has been accessed to determine whether the new file indicates that the update for the software product is available.

18. The computer program product of claim 8, wherein the update request is a manual request received from the user.

19. The computer program product of claim 8, wherein the update request is automatically triggered after a predetermined amount of time.

20. A method for managing software updates of a software product, the method comprising:

receiving a list of a plurality of software products from a user, wherein the plurality of software products are supported by a plurality of vendors;

determining a uniform resource locator (URL) of a download source for software update packages for each of the plurality of software products in the list, wherein the URL specifies a feed, wherein the feed is one of a resource description framework site summary feed and a rich site summary feed;

maintaining, at a download server, the list of the plurality of software products in association with the URL for each of the plurality of software products in the list and maintaining, at a download server, a listing of a number of files downloaded to the download server in association with the list of the plurality of software products, wherein the number of files are one of resource description framework site summary files and rich site summary files, wherein the number of files include a current version number for a software product in the list;

responsive to receiving an update request, accessing, at the download server via the URL, a file of the feed specified in the URL, wherein the file of the feed is one of a resource description framework site summary file and a rich site summary file;

determining whether an update version number in the file that has been accessed indicates that an update for the software product in the list is available based on the current version number of for the software product in the listing of the number of files maintained at the download server; and responsive to determining that the file specifies that an update for the software product in the list is available, downloading the file to the download server, wherein the download of the file is performed without any of the plurality of vendors sending the feed to the download server or the user.

* * * * *